(No Model.)
J. W. ALLEN.
METHOD OF TIGHTENING TIRES.
No. 605,534. Patented June 14, 1898.
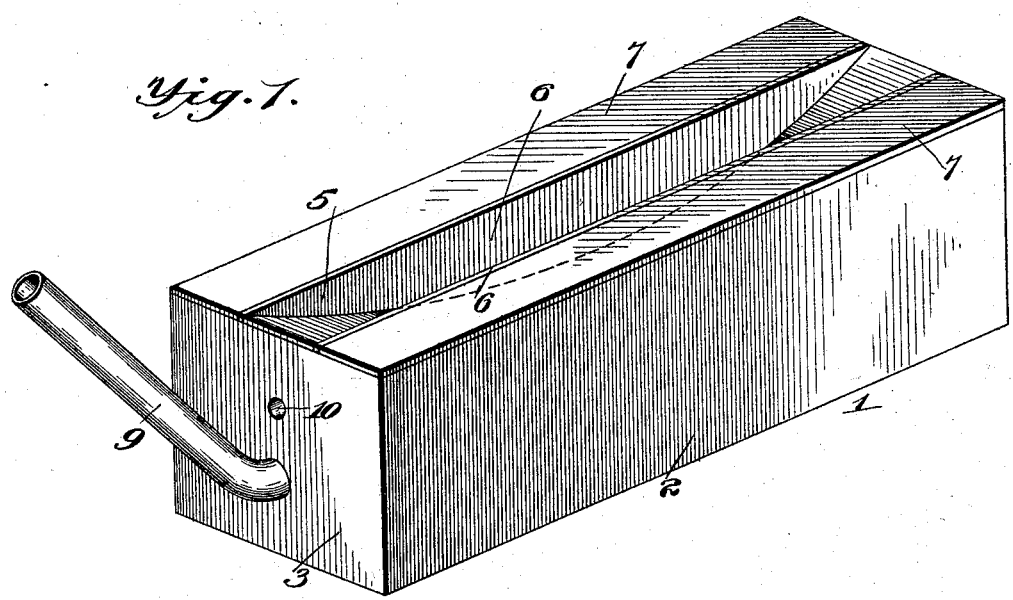
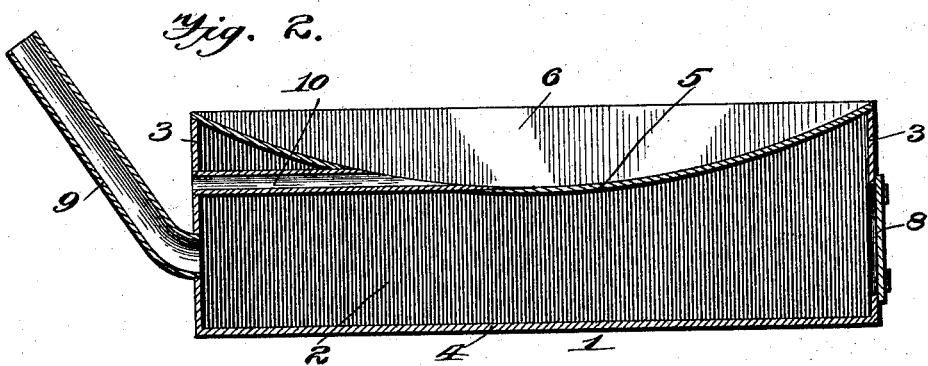
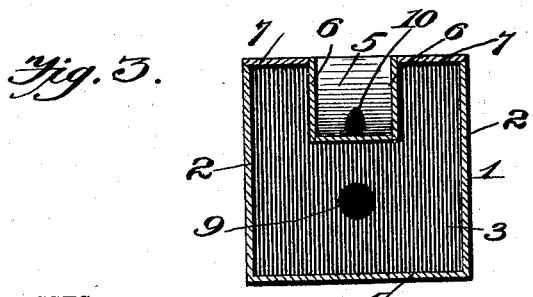
WITNESSES
INVENTOR,
John W. Allen.
By John Wedderburn
Attorney

UNITED STATES PATENT OFFICE.

JOHN W. ALLEN, OF DAVIS, INDIAN TERRITORY.

METHOD OF TIGHTENING TIRES.

SPECIFICATION forming part of Letters Patent No. 605,534, dated June 14, 1898.

Application filed December 2, 1896. Serial No. 614,234. (No model.)

*To all whom it may concern:*

Be it known that I, JOHN W. ALLEN, a citizen of the United States, residing at Davis, Chickasaw Nation, Indian Territory, have invented certain new and useful Improvements in Methods of Tightening Tires; and I do hereby declare the following to be a full, clear, and exact description of the invention, such as will enable others skilled in the art to which it appertains to make and use the same.

This invention relates to a method of tightening tires of vehicle-wheels, and has for its object to provide a novel method whereby a wooden felly may be expanded so that the metal tire surrounding the wooden rim of a vehicle-wheel may be tightened without the necessity of removing the tire from the rim.

With this general object in view the invention consists in a certain novel method of procedure, as hereinafter particularly set forth, illustrated in the drawings, and incorporated in the claims.

In the accompanying drawings, Figure 1 is a perspective view of the apparatus for tightening tires, the same being constructed in accordance with the present invention. Fig. 2 is a longitudinal section through the same. Fig. 3 is a vertical cross-section thereof.

Similar numerals of reference designate corresponding parts in the several figures of the drawings.

In the drawings I have illustrated a form of apparatus by means of which the present invention is carried out, consisting of a substantially rectangular box 1, the dimensions of which may be varied to agree with the size of the wheel to be operated upon and other requirements. The box 1 may be formed of any suitable sheet metal, such as galvanized iron, and comprises the side walls 2, the end walls 3, corresponding in height to the side walls, and an imperforate bottom 4.

Arranged centrally within the box 1 and extending longitudinally thereof is a longitudinally-concaved trough embodying a concavo-convex bottom 5 and segmental-shaped sides 6, the top edges of which are flush with the top of the box. The top of the box at each side of the trough is covered by means of the plates 7, and at one end the box is provided with a door 8, by means of which fuel may be supplied to the interior of the box for the purpose of building a fire therein. The depth of the fire-box is approximately twelve inches, while the depth of the trough need not exceed four or five inches, so that the heat from the fire reaches all points of the trough, including its sides and bottom. At the end opposite the door 8 a smoke-pipe 9 communicates with the fire-box for carrying off the products of combustion.

10 designates a drain-pipe for carrying off the liquid contents of the trough and which may be closed by an ordinary stopper.

In carrying out the invention a fire is built in the fire-box and the trough is partially or wholly filled with water. After said water reaches a boiling-point the rim of the wheel is revolved therein until the same becomes thoroughly saturated and steamed. The water is now drawn off from the trough and linseed-oil, combined with gum-arabic and English resin, is placed in the trough and brought to a boiling-point, the wheel-rim being then revolved slowly therein for a period of twenty-five minutes, more or less, or a sufficient length of time to enable the composition to penetrate the fibers of the wood and fill the interstices. The oil will drive all of the water out of the wooden felly, and when the rim cools it will be kept in its swollen or expanded condition, being unable to contract to its normal size on account of the filling agent which has penetrated therein. By means of the process described the rim swells until it bears firmly against the inner surface of the tire, thus tightening the connection between the rim and tire without the necessity of removing the tire. By experiment it has been found that the best proportion of the ingredients above referred to consists in using from one to one and one-half gallon of linseed-oil with eight ounces of gum-arabic and eight ounces of English resin, although of course these proportions may be varied according to the nature of the wood and as may be found most expedient in practice. It will also be apparent that the precise form of the fire-box and trough above described may be varied without departing from the spirit or sacrificing any of the advantages of the invention.

Having thus described the invention, what is claimed as new is—

1. The herein-described method of treating wooden fellies, the same consisting in submerging the felly in boiling water for swelling the same, and then submerging the felly in boiling oil having combined therewith a soluble filling agent, substantially as described.

2. The herein-described method of treating wooden fellies, the same consisting of revolving the same in boiling water and thereafter submerging or revolving the same in boiling oil impregnated with gum-arabic and resin, whereby the oil is caused to expel the water and fill the interstices of the felly with the gum-arabic and resin, the latter serving when hardened, to prevent the contraction of the felly to its normal size, substantially as described.

3. A method of treating wooden fellies, consisting in swelling the wood and then forcing therein heated oil having combined therewith a soluble filling agent, substantially as described.

4. A method of treating wooden fellies, consisting in swelling the wood and then forcing therein heated oil containing a soluble filling agent such as resin and gum-arabic, substantially as described.

In testimony whereof I have signed this specification in the presence of two subscribing witnesses.

JOHN W. ALLEN.

Witnesses:
J. R. BLYTHE,
HARRY W. FIELDING.